(12) United States Patent
Deng et al.

(10) Patent No.: US 10,051,437 B1
(45) Date of Patent: Aug. 14, 2018

(54) SYSTEM AND METHOD FOR IMPROVING GNSS RECEIVER TRACKING LOOP PERFORMANCE UNDER MULTIPATH SIGNAL INTERFERENCE

(71) Applicant: Marvell International Ltd., Hamilton (BM)

(72) Inventors: Jiangping Deng, Shanghai (CN); Zhike Jia, Fremont, CA (US); Jian Cheng, Shanghai (CN); Feng Xu, Milpitas, CA (US); Yongsong Wang, Shanghai (CN)

(73) Assignee: Marvell International Ltd., Hamilton (BM)

( * ) Notice: Subject to any disclaimer, the term of this patent is extended or adjusted under 35 U.S.C. 154(b) by 244 days.

(21) Appl. No.: 15/182,763

(22) Filed: Jun. 15, 2016

Related U.S. Application Data

(60) Provisional application No. 62/267,517, filed on Dec. 15, 2015, provisional application No. 62/196,469, filed on Jul. 24, 2015.

(51) Int. Cl.
*H04W 72/04* (2009.01)
*H04W 4/06* (2009.01)
*H04L 27/227* (2006.01)

(52) U.S. Cl.
CPC .......... *H04W 4/06* (2013.01); *H04L 27/2271* (2013.01); *H04W 72/0453* (2013.01)

(58) Field of Classification Search
CPC .............. H04W 72/0453; H04W 4/06; H04L 27/2271; H04B 17/345; H04B 1/109
See application file for complete search history.

(56) References Cited

U.S. PATENT DOCUMENTS

| | | | | |
|---|---|---|---|---|
| 5,949,815 A | * | 9/1999 | Pon | G01S 19/30 375/150 |
| 6,330,273 B1 | * | 12/2001 | Hulbert | H04B 1/7085 375/130 |

(Continued)

OTHER PUBLICATIONS

IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.

(Continued)

*Primary Examiner* — Afsar M Qureshi

(57) ABSTRACT

A receiver including a plurality of correlators to receive a satellite signal having a line of sight (LOS) component and a multipath (MP) component and generate correlator results corresponding to the received satellite signal. The receiver includes a peak search module to identify frequency peaks in the received satellite signal based on the correlator results, a peak selection module to identify the LOS component of the received satellite signal based on the identified frequency peaks and at least one of a code phase error module to generate a code phase error corresponding to the identified LOS component and a carrier frequency error module to generate a carrier frequency error corresponding to the identified LOS component. The plurality of correlators are further to generate the correlator results based on at least one of the code phase error and the carrier frequency error.

20 Claims, 7 Drawing Sheets

(56) References Cited

U.S. PATENT DOCUMENTS

| | | | | |
|---|---|---|---|---|
| 6,744,404 | B1* | 6/2004 | Whitehead | G01S 19/22 342/357.61 |
| 7,876,807 | B2* | 1/2011 | Ray | G01S 19/22 375/136 |
| 8,908,744 | B1* | 12/2014 | Qi | H04B 17/345 375/149 |
| 2003/0165186 | A1* | 9/2003 | Kohli | G01C 21/26 375/150 |
| 2007/0098055 | A1* | 5/2007 | Raman | G01S 19/22 375/150 |
| 2009/0110134 | A1* | 4/2009 | Yuan | G01S 19/30 375/371 |
| 2010/0176991 | A1* | 7/2010 | Webber | G01S 19/32 342/357.72 |
| 2011/0081049 | A1* | 4/2011 | Walter | G06K 9/4642 382/106 |
| 2015/0382318 | A1* | 12/2015 | Kim | G01S 5/0215 455/456.5 |

OTHER PUBLICATIONS 802.16-2009 IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.

IEEE Std 802.20-2008; IEEE Standard for Local and metropolitan area networks; Part 20: Air Interface for Mobile Broadband Wireless Access Systems Supporting Vehicular Mobility-Physical and Media Access Control Layer Specification; IEEE Computer Society; Sponsored by the LAN/MAN Standards Committee; Aug. 29, 2008; 1032 pages.

"Specification of the Bluetooth System" Master Table of Contents & Compliance Requirements—Covered Core Package version: 4.0; Jun. 30, 2010; 2302 pages.

IEEE P802.11ac / D2.1; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Mar. 2012; 363 pages.

IEEE Std. P802.11ad/D5.0 "Draft Standard for Information Technology—Telecommunications and information exchange between systems—Locl and metropolitan area networks—Specific requirements, Part 11: Wireless LAN Medium Access Control (MAC) and Physical Layer (PHY) specifications: Amendment 3: Enhancements for Very High Throughput in the 60 GHz Band," The Institute of Electrical and Electronics Engineers, Inc., Sep. 2011.

IEEE P802.11ah/D1.0 Draft Standard for Information Technology—Telecommunications and Information Exchange Between Systems Local and Metropolitan Area Networks—Specific Requirements; Part 11: Wireless LAN Medium Access Control (MAC) and Physical Layer (PHY) Specifications; Amendment 6: Sub 1 GHz License Exempt Operation; Oct. 2013; 394 pages.

* cited by examiner

SYSTEM AND METHOD FOR IMPROVING GNSS RECEIVER TRACKING LOOP PERFORMANCE UNDER MULTIPATH SIGNAL INTERFERENCE

CROSS-REFERENCE TO RELATED APPLICATIONS

This application claims the benefit of U.S. Provisional Application No. 62/196,469, filed on Jul. 24, 2015, and U.S. Provisional Application No. 62/267,517, filed on Dec. 15, 2015. The entire disclosures of the applications referenced above are incorporated herein by reference.

FIELD

The present disclosure relates to systems and methods for improving tracking loop performance of a receiver in a global navigation satellite system (GNSS).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A global navigation satellite system (GNSS) is a satellite-based navigation system used to determine a position (or a geographic location) of a receiver on Earth. The Global Positioning System (GPS) is an example of a GNSS. The GPS includes a constellation of 24 satellites (21 GPS satellites and three spare satellites) that orbit the Earth at 10,600 miles above the Earth. The satellites are spaced so that from any point on Earth, at least four satellites will be above the horizon. The satellites enable a receiver to determine a position (e.g., a geographic location) of the receiver. In commercial applications, the accuracy of a determined position can vary between 100 meters to 10 meters from an actual position of a receiver. In other applications requiring more precision—e.g., military applications, survey applications, or the like—the accuracy of a determined position can be within one meter from an actual position of a receiver.

Each satellite includes a computer, an atomic clock, and a radio. With knowledge of its own orbit and clock, each satellite periodically broadcasts its position and time. Each satellite transmits signals (referred to herein as "satellite signals") at precise intervals. On the ground, a receiver includes a computer that converts information received in the satellite signals into data including position, velocity, and time estimates. Using the data received from a given satellite, a receiver can calculate a position of the given satellite, and the distance between given satellite and the receiver. Accordingly, the receiver can then use triangulation or other techniques to determine a position of the receiver by obtaining similar information from a number of other satellites.

The receiver may use a code tracking loop and a carrier tracking loop to track a code phase and carrier frequency (or carrier phase) of received GNSS signals. FIG. 1 shows an example receiver 100 implementing a tracking loop. In one example, the tracking loop corresponds to baseband correlators 108, a code discriminator 112, a carrier discriminator 116, and loop filters 120 and 124. The baseband correlators 108 receive a GNSS signal and output in phase (I) and quadrature (Q) signals based on the GNSS signal. The I and Q signals include $I_{prompt}$ and $Q_{prompt}$ signals (e.g., corresponding to samples aligned with the incoming GNSS signal), $I_{later}$ and $Q_{later}$ signals (e.g., corresponding to samples subsequent to the incoming GNSS signal), and $I_{early}$ and $Q_{early}$ signals (e.g., corresponding to samples prior to the incoming GNSS signal) generated by respective ones of the correlators 108. For example only, the code discriminator 112, the loop filter 120, and associated components of the correlators 108 define a code tracking loop (e.g., a delay lock loop, or DLL). Conversely, the carrier discriminator 116, the loop filter 124, and associated components of the correlators 108 (e.g., a numerically controlled oscillator, or NCO, a voltage controlled oscillator, or VCO, etc., not shown) define a carrier tracking loop (e.g., a frequency lock loop, or FLL, a phase locked loop, or PLL, etc.).

The code discriminator 112 calculates a code phase error associated with the received signal based on the $I_{prompt}$ and $Q_{prompt}$ signals, the $I_{later}$ and $Q_{later}$ signals, and the $I_{early}$ and $Q_{early}$ signals. For example only, the code discriminator 112 may calculate the code phase error according to $$\frac{\sqrt{I_{early}^2 + Q_{early}^2} - \sqrt{I_{later}^2 + Q_{later}^2}}{\sqrt{I_{early}^2 + Q_{early}^2} + \sqrt{I_{later}^2 + Q_{later}^2}},$$

$$(I_{early} - I_{later})I_{prompt} + (Q_{early} - Q_{later})Q_{prompt},$$

etc. Conversely, the carrier discriminator 116 calculates a carrier frequency error, or carrier Doppler error (i.e., a Doppler frequency shift), associated with the received signal based on the $I_{prompt}$ and $Q_{prompt}$ signals. The correlators 108 selectively adjust (i.e., "track") the $I_{prompt}$ and $Q_{prompt}$ signals, the $I_{later}$ and $Q_{later}$ signals, and the $I_{early}$ and $Q_{early}$ signals based on the calculated code phase error and Doppler frequency shift.

SUMMARY

A receiver including a plurality of correlators to receive a satellite signal having a line of sight (LOS) component and a multipath (MP) component and generate correlator results corresponding to the received satellite signal. The receiver includes a peak search module to identify frequency peaks in the received satellite signal based on the correlator results, a peak selection module to identify the LOS component of the received satellite signal based on the identified frequency peaks and at least one of a code phase error module to generate a code phase error corresponding to the identified LOS component and a carrier frequency error module to generate a carrier frequency error corresponding to the identified LOS component. The plurality of correlators are further to generate the correlator results based on at least one of the code phase error and the carrier frequency error.

A method of operating receiver includes receiving, at a plurality of correlators, a satellite signal having a line of sight (LOS) component and a multipath (MP) component, generating correlator results corresponding to the received satellite signal, identifying frequency peaks in the received satellite signal based on the correlator results, identifying the LOS component of the received satellite signal based on the identified frequency peaks, at least one of (i) generating a code phase error corresponding to the identified LOS component and generating a carrier frequency error corresponding to the identified LOS component, and generating the correlator results based on at least one of the code phase error and the carrier frequency error.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

In a global navigation satellite system (GNSS), a receiver may use a code tracking loop and a carrier tracking loop to track a code phase and carrier frequency (or carrier phase) of received GNSS signals. The tracked code phase and carrier frequency (or carrier phase) are used for calculating position, velocity, and time (PVT) of a GNSS device implementing the receiver. In some environments (e.g., urban canyons), devices may receive both line of sight (LOS) GNSS signals and multipath (MP) GNSS signals. The MP signals may influence performance of the tracking loop. For example, when the MP signals are stronger than the LOS signals, a larger tracking error may result.

MP signals and LOS signals have different characteristics as received by the GNSS device. For example, MP signals and LOS signals have different receiving angles. Accordingly, as a GNSS device moves, MP signals and LOS signals are associated with different Doppler effects. Further, MP signals are typically received subsequent to LOS signals. Systems and methods according to the principles of the present disclosure improve tracking loop performance in the presence of interference from MP signals based on the differences between respective characteristics of MP signals and LOS signals.

Figure 1:
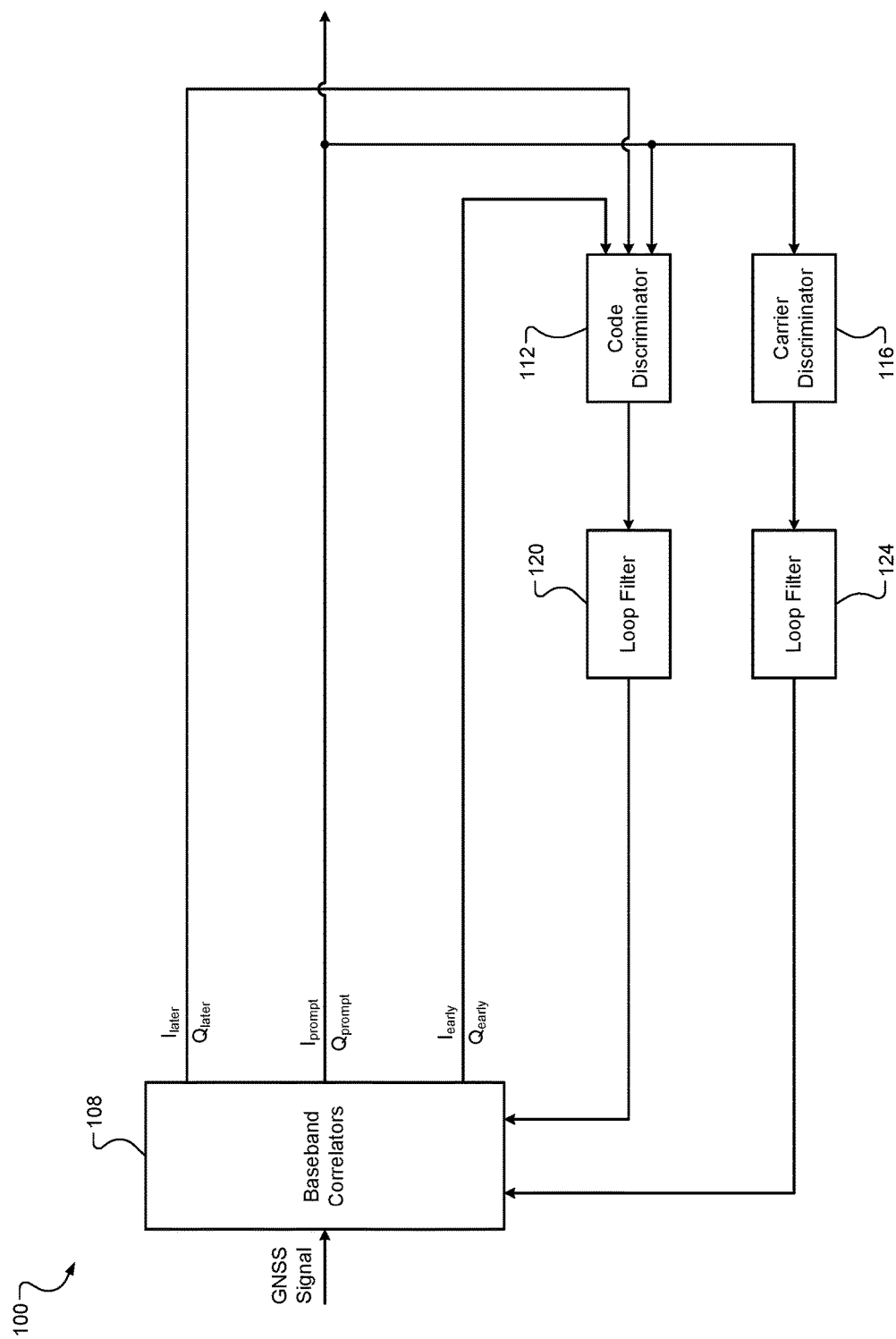
FIG. 1 is a functional block diagram of an example receiver in a global navigation satellite system (GNSS) device.
Figure 2:
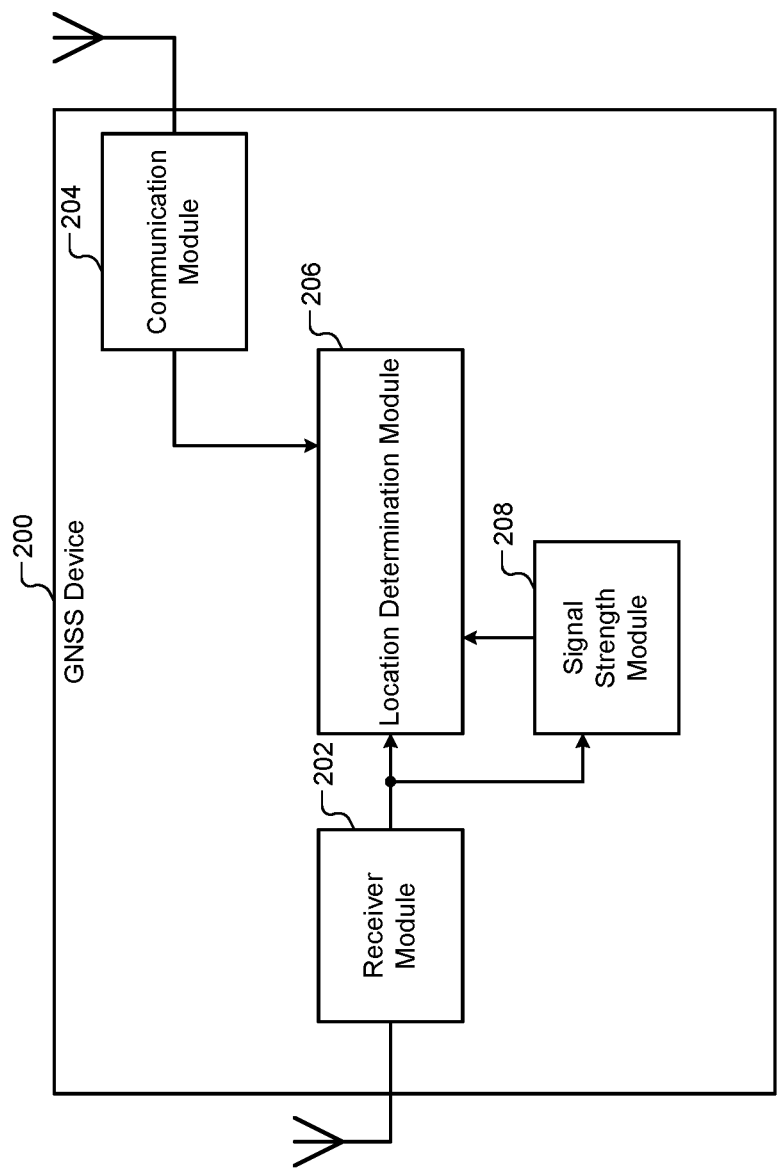
FIG. 2 is a functional block diagram of an example GNSS device according to the present disclosure.

FIG. 2 shows a GNSS device 200 (receiver) according to an embodiment of the present disclosure. The GNSS device 200 includes a receiver module 202, a communication module 204, and a location determination module 206. In operation, upon the GNSS device being activated (e.g., turned on or started), the receiver module 202 acquires GNSS signals from a plurality of satellites within a predetermined period of time.

The communication module 204 obtains, subsequent to the GNSS device 200 being turned on, ephemeris data of the satellites from a server (not shown). The communication module 204 obtains the ephemeris data from the server via a wireless network, such as, for example, a cellular network, a WiFi network, etc. In one embodiment, the communication module 204 also obtains almanac data from the server. The location determination module 206 determines a position of the GNSS device 200 based on the signals received from the satellites, and the ephemeris data received from the server. In one example, the location determination module 206 further utilizes the almanac data to determine a position of the GNSS device 200.

In one example, the location determination module 206 determines a position of the GNSS device 200 by utilizing the signal strength of the signals received from the satellites and one or more of three measurements derived from the signals received from the satellites: code phase (e.g., including code phase error), code phase error, or Doppler frequency shift. In addition, the location determination module 206 utilizes the ephemeris data received from the server to determine the position of the GNSS device 200. In some examples, a signal strength module 208 measures signal strengths of the GNSS signals received from the satellites and provides the signal strengths to the location determination module 206.

The location determination module 206 may implement a search procedure using parameters including, but not limited to, code phase and Doppler frequency shift. The processes of determining the code phase and the Doppler frequency shift are explained below.

The satellites transmit GNSS signals using code division multiple access (CDMA). Each satellite transmits a unique code that repeats every millisecond. The receiver module 202 generates a replica of a signal received from the satellite. The signal received (or acquired) from a satellite is correlated with the generated replica signal. The phase of the replica signal is shifted until a correlation is found between the signal received from the satellite and the replica signal.

The amount by which the phase of the replica signal is generated by the code generation module 210 to achieve the correlation corresponds to code phase, or code phase error. Since the signals received from the satellites include a Doppler frequency shift, it is possible that the code phase is not an integer number of milliseconds. Instead, the code phase may include an integer (millisecond or msec) portion and a non-integer (sub-millisecond or sub-msec) portion. The receiver module 216 further measures a Doppler frequency shift observed at a position of the GNSS device 200. In particular, the Doppler frequency shift between the signal received from one of the satellites and a corresponding replica signal is measured.

The receiver module 202 implements a carrier tracking loop to track a code phase and carrier frequency or carrier phase (i.e., corresponding to the Doppler frequency shift) of the received GNSS signals. In particular, the receiver module 202 implements the systems and methods according to the principles of the present disclosure to provide improved tracking loop performance in the presence of interference from MP signals as described below in more detail.

Figure 3:
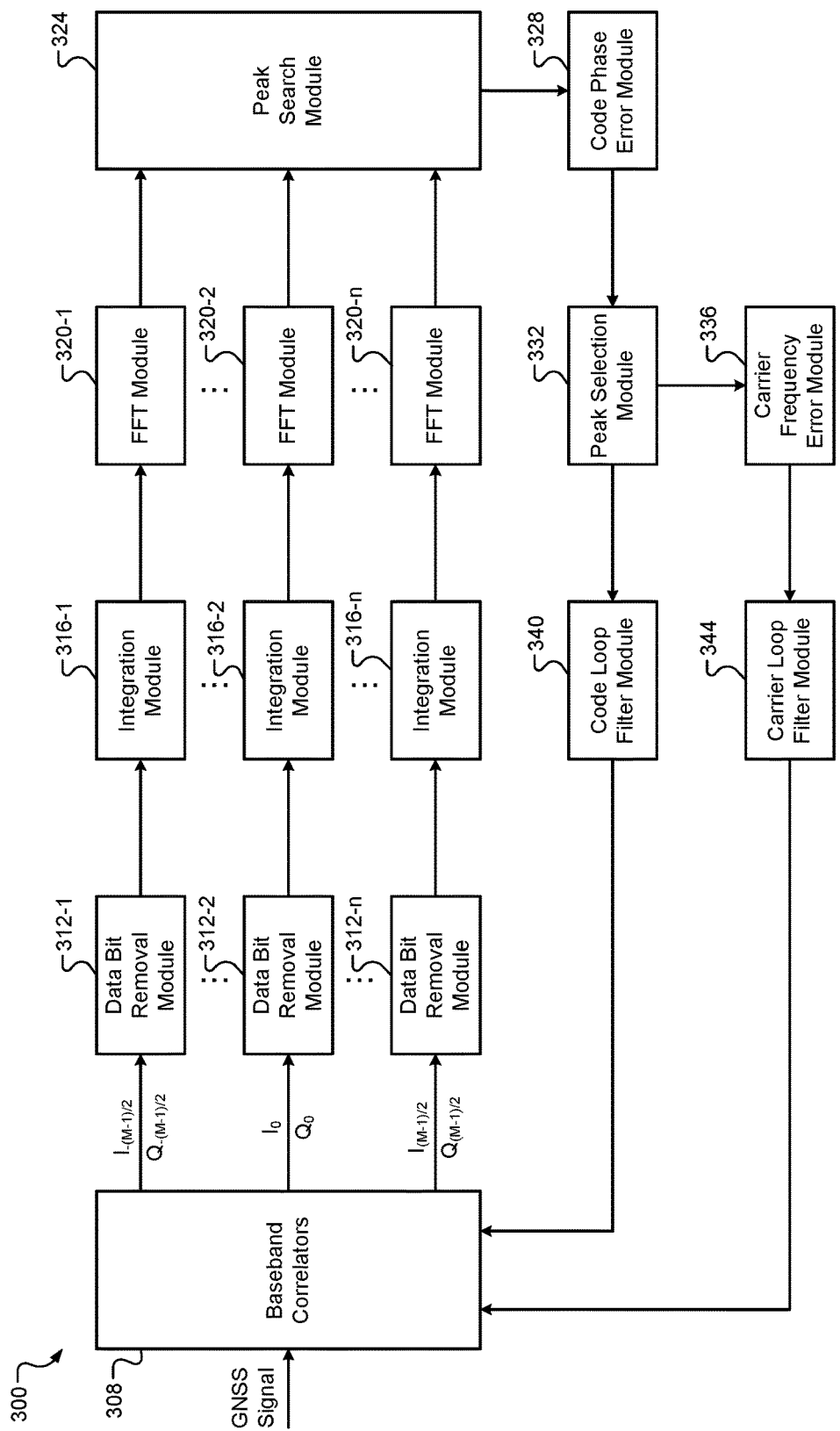
FIG. 3 is an example receiver module including a tracking loop according to the present disclosure.

FIG. 3 shows an example receiver module 300 implementing a GNSS tracking loop according to the principles of the present disclosure. The tracking loop corresponds to baseband correlators 308, data bit removal modules 312-1, 312-2, . . . , and 312-$n$, referred to collectively as data bit removal modules 312, integration modules 316-1, 316-2, . . . , and 316-$n$, referred to collectively as integration modules 316, fast Fourier transform (FFT) modules 320-1, 320-2, . . . , and 320-$n$, referred to collectively as FFT modules 320, a peak search module 324, a code phase error module 328, a peak selection module 332, a carrier frequency error module 336, a code loop filter module 340, and a carrier loop filter module 344.

The baseband correlators 308 correspond, for example, to M baseband correlators that perform carrier removal and pseudo-random code generation on a received GNSS signal. The correlators 308 generate respective pseudo-random codes having different phase delays based on the GNSS signal. For example, the correlators 308 output in phase (I) and quadrature (Q) signals $I_n$ and $Q_n$ for n from $-(M-1)/2$ to 0 to $(M-1)/2$, where n is 0 for prompt (i.e., real-time) I and Q signals, n is positive for early I and Q signals, and n is negative for later I and Q signals. The I and Q signals include prompt I and Q signals (e.g., $I_0$ and $Q_0$), later I and Q signals (e.g., $I_{-(M-1)/2}$ and $Q_{-(M-1)/2}$), and $I_{early}$ and $Q_{early}$ signals (e.g., $I_{(M-1)/2}$ and $Q_{(M-1)/2}$) generated by respective ones of the correlators 308. Respective outputs S of the correlators 308 can be defined according to the following (Equation 1):

$$S = A_{LOS}R(\Delta\tau_{LOS} + nd)D\mathrm{sinc}(\pi\Delta f_{LOS}T)\exp[j(\pi\Delta f_{LOS}T + \theta_{LOS})] + \sum_{i=1}^{w} A_i R(\Delta\tau_i + nd)D\mathrm{sinc}(\pi\Delta f_i T)\exp[j(\pi\Delta f_i T + \theta_i)],$$

where: $A_{LOS}$ is an amplitude of an LOS signal after correlation; R(x) is a self-correlation function of pseudo-random codes; $\Delta\tau_{LOS}$ is a code phase difference between a local replica signal and a line of sight (LOS) signal; d is a code phase space of a respective correlator; n varies from $-(M-1)/2$ to $(M-1)/2$ for respective correlators; D is a data bit; sin c(x)=sin(x)/x, corresponding to the sinc function; $\Delta f_{LOS}$ is a Doppler frequency difference between the local replica signal and the LOS signal; T is integral time; $\vartheta_{LOS}$ is a carrier phase difference between the local replica signal and the LOS signal; $A_i$ is an amplitude of an $i^{th}$ multipath (MP) signal; $\Delta\tau_i$ is a code phase difference between the local replica signal and the $i^{th}$ MP signal; $\Delta f_i$ is a Doppler frequency difference between the local replica signal and the $i^{th}$ MP signal; and $\vartheta_i$ is an initial carrier phase difference between the local replica signal and the LOS signal.

For example only, a main lobe of the sinc function is located between $-1/T$ Hz and $1/T$ Hz. For example, for a GPS L1 C/A signal, T is 1 ms and the main lobe of the sinc function is located between $-1$ kHz and 1 kHz. Accordingly, to obtain a precise frequency resolution for distinguishing the LOS signal from the MP signals, relatively long correlator results are required. For example, for a 5 Hz frequency resolution, correlator results having a length of 200 ms are required.

The data bit removal modules 312 receive the outputs (i.e., correlator results) of the baseband correlators 308 and remove respective data bits from the correlator results. For example, the data bits may be removed to prevent data symbols from being inverted during FFT processing. For example only, the data bit may be determined via pre-recorded effective ephemeris and almanac data, online decoding, etc. For some modern GNSS signals, pilot channels are not data bit modulated and therefore data bit removal is not required.

The integration modules 316 receive the respective correlator results (e.g., with the data bit removed). The correlator results may correspond to μ millisecond correlator results. The integration modules 316 integrate the correlator results prior to the correlator results being provided to the FFT modules 320. Accordingly, a number of FFT points is reduced. For example only, the integrated correlator results have v points.

The FFT modules 320 perform FFT processing on the v point integrated correlator results to acquire the frequency spectrum of the correlator results. For example, the FFT modules 320 perform N point FFT processing on the integrated correlator results, where N is not less than v. The FFT processing generates M×N FFT results. The M×N FFT results correspond to a two dimensional matrix including a code space dimension having M code phases and a frequency dimension having N frequency bins.

Figure 4:
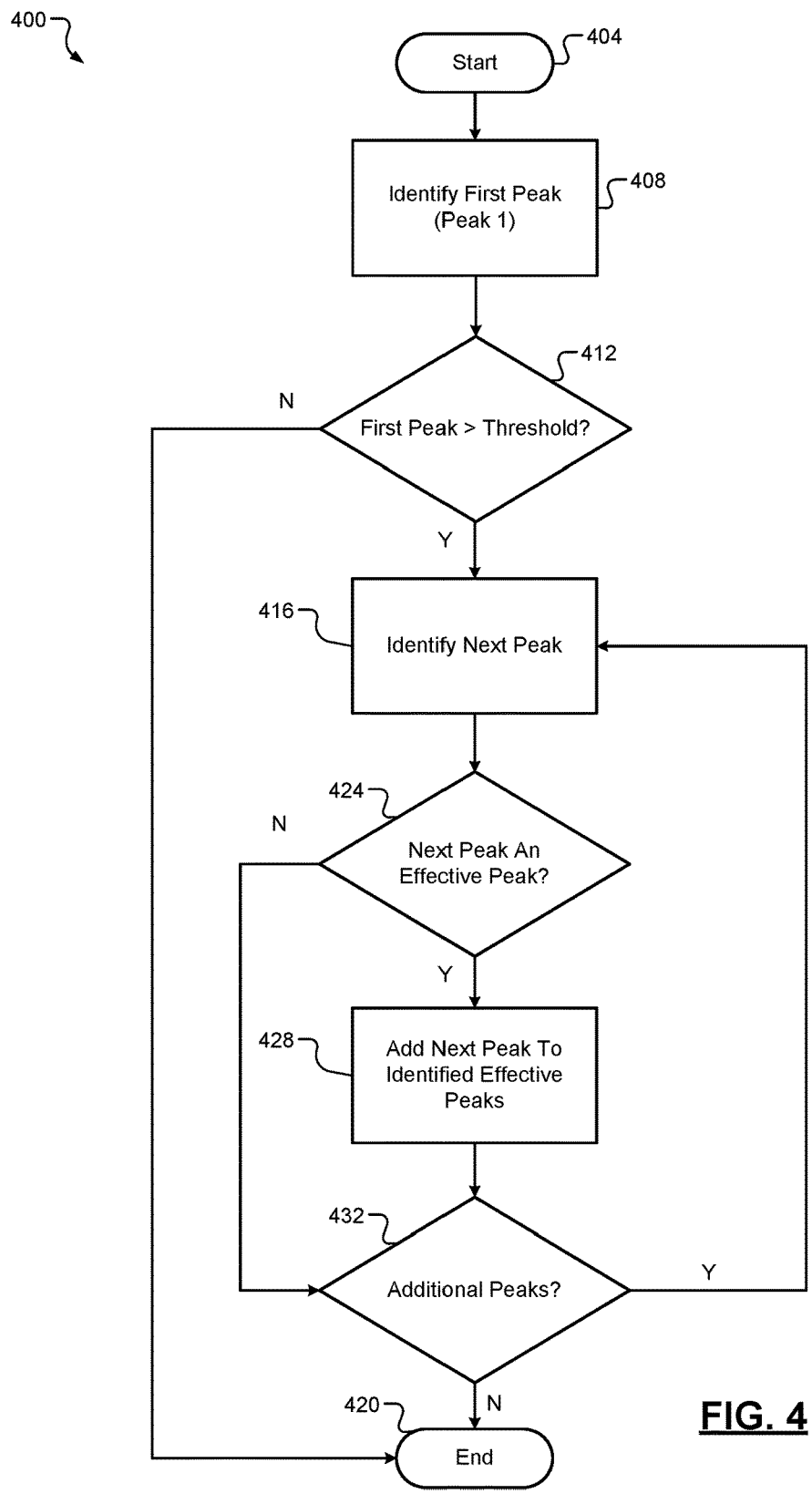
FIG. 4 is an example method for identifying effective peaks of a received GNSS signal according to the present disclosure.

The peak search module 324 searches the M×N FFT results to identify effective peaks (i.e., frequency peaks) therein. For example, if no MP signals are present, the acquired frequency spectrum typically includes only a single effective peak corresponding to the LOS signal. Conversely, if the received GNSS signal includes MP signals, the frequency spectrum may include a plurality of effective peaks. FIG. 4 shows an example method 400 (e.g., implemented by the peak search module 324) for searching the M×N FFT results to identify effective peaks. The method 400 begins at 404 and transitions to 408. At 408, the method 400 identifies a first peak (the strongest peak) in the M×N FFT results. At 412, the method 400 compares the first peak to a background noise threshold to determine whether the amplitude (e.g., power) of the first peak is a predetermined amount greater than the background noise. For example, the background noise threshold may correspond to the predetermined amount greater than the background noise. A comparison between the power of the first peak to the background noise threshold can be expressed according to the following (Equation 2):

$$(P-\mu\cdot v\cdot\delta^2)/(\mu^2\cdot v^2\delta^2) > th,$$

where: P is peak power of the first peak; $\delta^2$ is 1 ms background noise power; and th is the background noise threshold.

If the result of 412 is true, the method 400 identifies the first peak as an effective peak and continues to 416. The method 400 may store a list or table of all identified effective peaks. For example, the peak search module 324 may provide indicators of identified effective peaks to the code phase error module 328, which stores data (e.g., a list or table) identifying the effective peaks identified by the peak search module 324. If the result of 412 is false, the method 400 ends at 420. In other words, at 412, the method 400 determines whether the power of the received signal is sufficient, relative to the background noise, to accurately identify the effective peaks in the M×N FFT results.

At 416, the method 400 searches the M×N FFT results to identify a next peak. A lateral frequency bin in the main lobe of the identified first peak (and any previously identified next peaks) may be removed during the search for the next peak. At 424, a power of the identified next peak is compared to each of the background noise and the identified first peak to determine whether the identified next peak qualifies as an effective peak. For example, a comparison between the power of the identified next peak and the background noise can be expressed according to Equation 2 above. Conversely, a comparison between the power of the identified next peak and the identified first peak can be expressed according to the following (Equation 3):

$$P_i/P_1 > th,$$

where: $P_1$ is the strongest peak (as identified initially); $P_i$ is the $i^{th}$ peak (e.g., the current identified next peak); i>1; and th is an effective peak threshold.

If the result of 424 is true (i.e., the power of the identified next peak satisfies each of Equation 2 and Equation 3), the method 400 adds the identified next peak to the identified effective peaks at 428 and continues to 432. At 432, the method 400 determines whether the M×N FFT results include any additional peaks to identify. If yes, the method 400 continues to 416. If no, the method 400 ends at 420.

Figure 5:
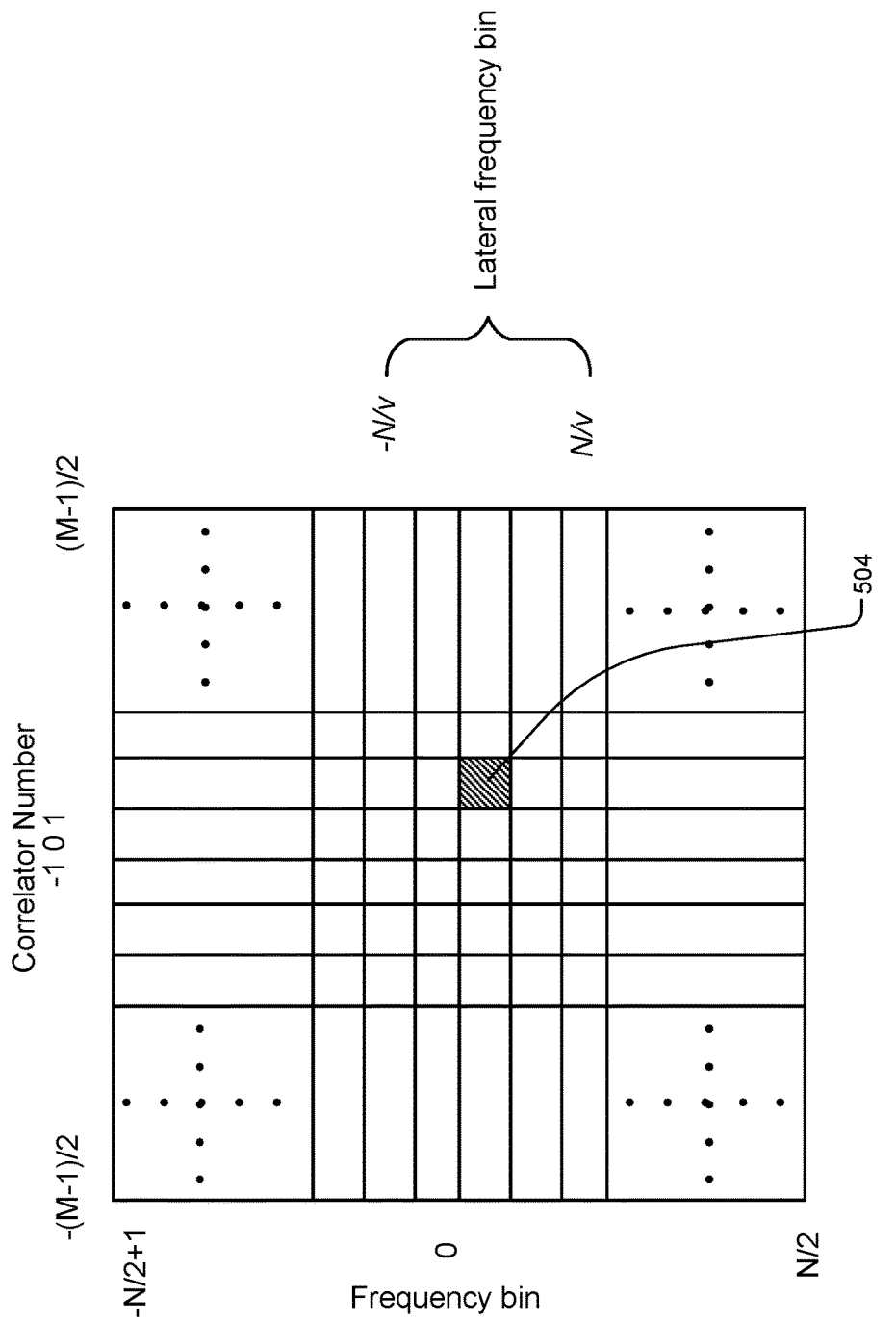
FIG. 5 is an example frequency bin including an identified effective peak according to the present disclosure.

FIG. 5 shows an example frequency bin 500 including an identified effective peak 504. For example only, the frequency bin 500 includes a lateral frequency bin having a step length of 1000/(N×µ)Hz. A main lobe of the frequency bin extends from −1000/(µ×v)Hz to 1000/(µ×v)Hz. Accordingly, the lateral frequency bin extends from −N/v bin to NA bin within the frequency bin 500 relative to the identified effective peak 504.

Referring again to FIG. 3, the code phase error module 328 receives the identified effective peaks from the peak search module 324, calculates the code phase error of each of the identified effective peaks, and provides the respective code phase errors to peak selection module 332. For example, the code phase error module 328 calculates the code phase error of each of the identified effective peaks according to the following (Equation 4):

$$\Delta\tau = \begin{cases} m \cdot d, m = \pm(M-1)/2 \\ m \cdot d - 0.5 \times d \times [p(m-1) - p(m+1)]/ \\ \qquad [2p(m) - p(m-1) - p(m+1)], \text{else} \end{cases}$$

Where: $\Delta\tau$ is the code phase error for the identified effective peak; m is the correlator corresponding to the identified effective peak; p(m) is the amplitude of the identified effective peak; and p(m−1) and p(m+1) are respective amplitudes of a left neighbor and a right neighbor of the identified effective peak in a code phase dimension.

The peak selection module 332 receives the code phase errors as calculated by the code phase error module 328 and identifies and selects the LOS peak from among the identified effective peaks based on the received code phase errors. For example, a magnitude of a code phase error may be indicative of when the associated signal was received by the receiver module 300. Larger code phase errors are associated with earlier-received signals, and a largest code phase error may correspond to an earliest-received signal. Accordingly, the peak selection module 332 identifies, as an LOS peak candidate, the largest code phase error among the code phase errors received from the code phase error module 328.

Although the largest code phase error typically corresponds to the LOS peak, noise and/or other factors may interfere with the calculation. Accordingly, the peak selection module 332 may perform additional calculations to verify that the LOS peak candidate is the actual LOS peak. For example, the peak selection module 332 identifies (e.g., stores data identifying) the largest code phase error as $\Delta\tau_{max}$ and identifies the corresponding identified effective peak as M. The code phase error of the identified first peak is denoted as $\Delta\tau_1$. If the peak M (i.e., the peak having the largest code phase error) corresponds to the identified first peak, then the peak M is selected as the LOS peak. However, if the peak M does not correspond to the identified first peak, the largest code phase error $\Delta\tau_{max}$ is compared to $\Delta\tau_1$. If ($\Delta\tau_{max}-\Delta\tau_1$) is greater than a threshold (e.g., 0.1 chip, corresponding to calculation error caused by noise), the peak M is selected as the LOS peak. Conversely, if ($\Delta\tau_{max}-\Delta\tau_1$) is not greater than the threshold, the identified first peak is selected as the LOS peak. The peak selection module 332 provides the code phase error of the selected LOS peak to the code loop filter module 340.

The carrier frequency error module 336 calculates a carrier frequency error (also referred to as carrier Doppler error) of the selected LOS peak. For example, the peak selection module 332 provides an indication of the selected LOS peak to the carrier frequency error module 336. The carrier frequency error module 336 calculates the carrier frequency error according to the following (Equation 5):

$$\Delta f = \begin{cases} n \cdot f_b, n = -\frac{N}{2} + 1, N/2 \\ n \cdot f_b - 0.5 \times f_b \times [p(n-1) - p(n+1)]/ \\ \qquad [2p(n) - p(n-1) - p(n+1)], \text{else} \end{cases}$$

Where: $\Delta f$ is the carrier frequency error; $f_b$ is a frequency bin step length; n is the frequency bin number corresponding to the selected LOS peak; p(n) is the amplitude of selected LOS peak; and p(n−1) and p(n+1) are respective amplitudes of an upper neighbor and a lower neighbor of the selected LOS peak in a frequency dimension. The carrier frequency error module 336 provides the calculated carrier frequency error to the carrier loop filter module 344. Accordingly, the code phase error and the carrier frequency error for the selected LOS peak are provided as inputs of a respective code tracking loop and carrier tracking loop of the tracking loop and the correlators 308.

Figure 6:
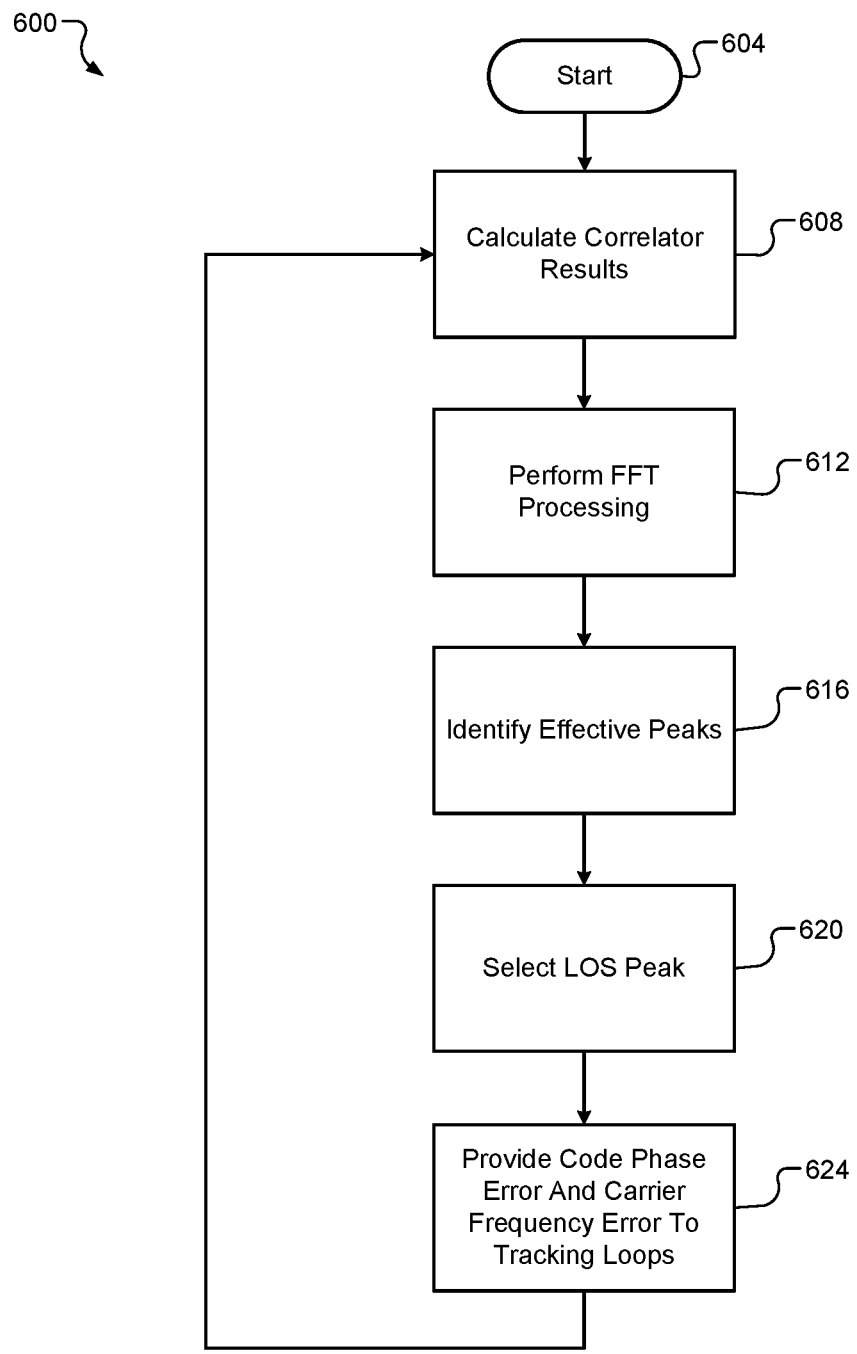
FIG. 6 is an example method for providing a code phase error and a carrier frequency error to a tracking loop according to the present disclosure.

FIG. 6 shows an example method 600 for providing a code phase error and a carrier frequency error of a received GNSS signal to a tracking loop according to the present disclosure. The method 600 begins at 604 and transitions to 608. At 608, the method 600 calculates correlator results for the GNSS signal (e.g., using correlators 308). At 612, the method 600 performs FFT processing (e.g., using FFT modules 320) on the correlator results to acquire the frequency spectrum (e.g., as M×N FFT results) of the correlator results. At 616, the method 600 identifies the effective peaks in the M×N FFT results (e.g., using the peak search module 324). At 620, the method 600 identifies and selects the LOS peak from the identified effective peaks (e.g., using the code phase error module 328 and the peak selection module 332. At 624, the method 600 provides the code phase error and the carrier frequency error corresponding to the selected LOS peak to the code tracking loop and the carrier tracking loop via the code loop filter module 340 and the carrier loop filter module 344 (e.g., using the code phase error module 328 and the carrier frequency error module 336).

In some examples, the systems and methods of the present disclosure further use the determined carrier frequency (Doppler) error of the selected LOS peak to calculate respective carrier Doppler errors of all presently tracked satellites associated with the GNSS device 200. For example, some situations (e.g., sudden stopping and movement of the GNSS device 200, which may correspond to the GNSS device 200 being operated in stop and go traffic) may result in significant deviation in respective carrier frequencies and associated carrier Doppler error. This deviation may be referred to as a "dynamic." In these dynamic situations, the receiver module 300 may implement a carrier Doppler error compensation method 700 as described below.

Figure 7:
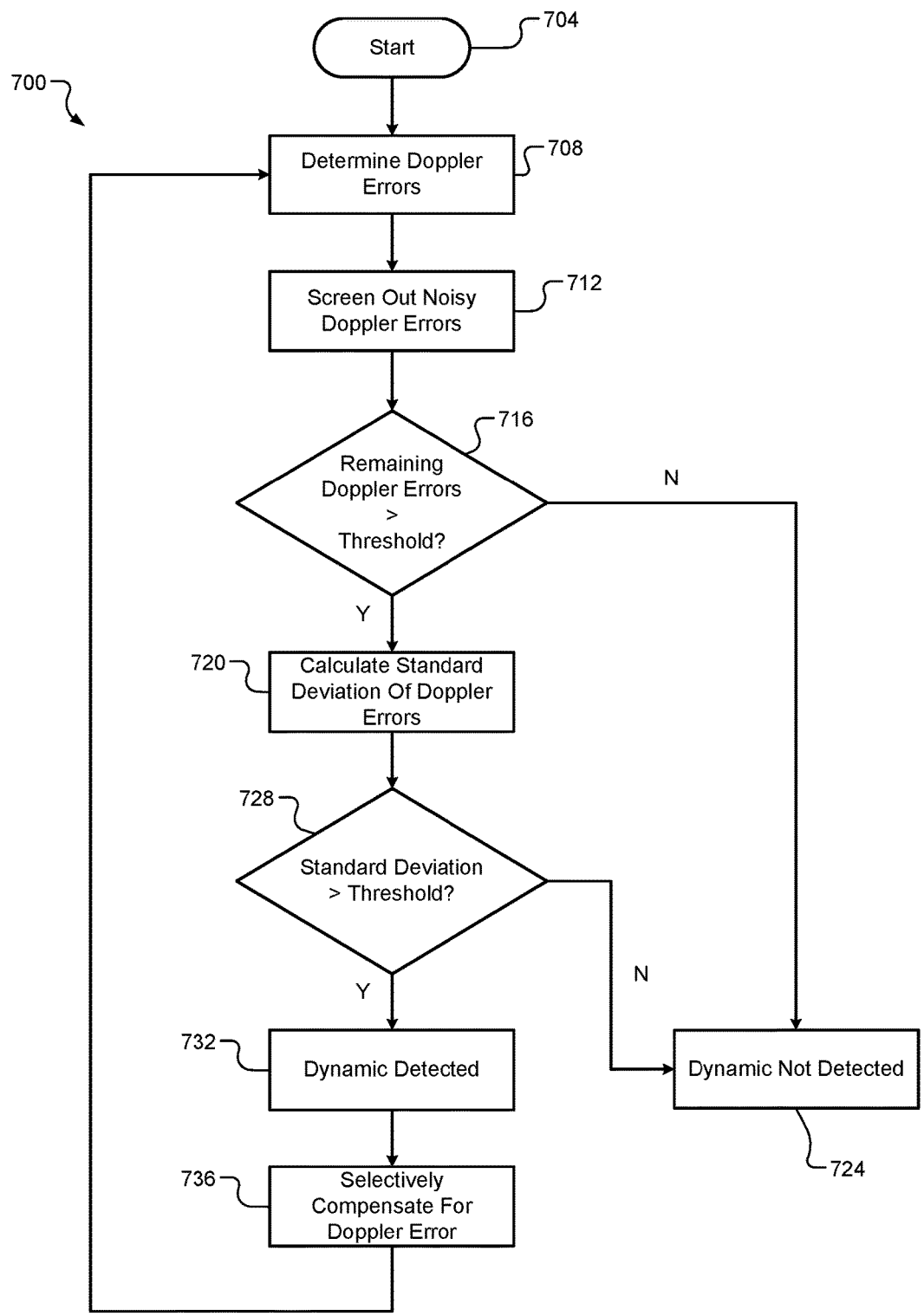
FIG. 7 is example method for carrier Doppler error compensation according to the present disclosure.

FIG. 7 shows an example of the carrier Doppler error compensation method 700 beginning at 704. For example, the carrier frequency error module 336 may be configured to implement the method 700. At 708, the method 700 determines respective carrier Doppler errors of all tracked satellites. For example, the determined carrier Doppler errors may all correspond to the carrier Doppler errors of the tracked satellites at a same sample time. In one example, the carrier frequency error module 336 stores the calculated Doppler errors for each of the satellites (e.g., in a respective buffer, such as a first in, first out buffer). The calculated Doppler errors may be stored for a predetermined measurement period (e.g., 2 seconds) before being replaced with a re-calculated (i.e., updated) carrier Doppler error.

At 712, the method 700 screens out any of the carrier Doppler errors that correspond to noisy signals (e.g., weak or blocked signals, signals affected by interference, etc.) For example, if one of the carrier Doppler errors is significantly greater than the other Doppler errors (e.g., greater than an average of the other carrier Doppler errors by a predetermined amount, or is otherwise determined to be an outlier using suitable mathematical methods), that carrier Doppler error can be removed from consideration by the method 700.

At 716, the method 700 determines whether a remaining number of the calculated Doppler errors (i.e., the number of the calculated Doppler errors that were not identified as being associated with noisy signals) is greater than a threshold (e.g., in the present example, 3). If true, the method 700 continues to 720. If false, the method 700 continues to 724. At 724, the method 700 determines that a dynamic situation was not detected. In other words, in this example (e.g., an insufficient amount of reliable signals were received), the method 700 did not have sufficient information to detect a dynamic situation.

At 720, the method 700 calculates a standard deviation of the remaining calculated Doppler errors. At 728, the method 700 determines whether the calculated standard deviation is greater than a threshold. If true, the method 700 continues to 732. If false, the method 700 continues to 724. At 724, the method 700 determines that a dynamic situation was not detected, while at 732, the method 700 determines that a dynamic situation was detected. In other words, a 724 and 732, the method 700 determines whether a dynamic situation based on whether a standard deviation of the calculated Doppler errors associated with the tracked satellites is greater than a threshold. For example, the carrier frequency error module 336 may provide an indication (e.g., to the baseband correlators 308 or another component of the GNSS device 200) of whether a dynamic situation was detected). In some examples, the method 700 may be required to detect a dynamic situation at 732 a predetermined number of times, a predetermined frequency, etc. (e.g., for at least 2, 3, 4, etc. consecutive measurement periods) to confirm that a dynamic situation is present.

At 736, the method 700 selectively compensates for the calculated Doppler error based on whether a dynamic situation was detected. For example, if a dynamic situation was detected the method 700 may adjust a Doppler measurement according to the calculated Doppler error. For example, the method 700 may compensate for the Doppler measurement according to the following (Equation 6):

$$f_{Doppler}=f_{Doppler}-\Delta f,$$

where: $f_{Doppler}$ is the Doppler measurement; and $\Delta f$ is the carrier Doppler error (or, carrier frequency error) calculated according to Equation 5, above.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A receiver, comprising:
   a plurality of correlators to (i) receive a satellite signal having a line of sight (LOS) component and a multipath (MP) component and (ii) generate correlator results corresponding to the received satellite signal;
   a peak search module to identify frequency peaks in the received satellite signal based on the correlator results;
   a peak selection module to identify the LOS component of the received satellite signal based on the identified frequency peaks; and
   at least one of (i) a code phase error module to generate a code phase error corresponding to the identified LOS component and (ii) a carrier frequency error module to generate a carrier frequency error corresponding to the identified LOS component,
   wherein the plurality of correlators are further to generate the correlator results based on at least one of the code phase error and the carrier frequency error.

2. The receiver of claim 1, further comprising a fast Fourier transform (FFT) module to (i) generate FFT results based on the correlator results and (ii) provide the FFT results to the peak search module, wherein the FFT results include a frequency spectrum of the correlator results.

3. The receiver of claim 2, wherein the FFT results include M×N FFT results, wherein M is a number of the plurality of correlators, and wherein N is a number of points of FFT processing performed by the FFT module.

4. The receiver of claim 2, wherein, to identify the frequency peaks, the peak search module is further to (i) identify a first peak in the frequency spectrum, (ii) compare the first peak to background noise, and (iii) selectively identify the first peak as a frequency peak based on the comparison.

5. The receiver of claim 4, wherein, to identify the frequency peaks, the peak search module is further to (i) identify a next peak in the frequency spectrum, (ii) compare the next peak to background noise and the first peak, and (iii) selectively identify the next peak as a frequency peak based on the comparison.

6. The receiver of claim 1, wherein, to identify the LOS component, the peak selection module is further to (i) receive respective code phase errors associated with the identified frequency peaks and (ii) identify the LOS component based on the respective code phase errors.

7. The receiver of claim 6, wherein, to identify the LOS component, the peak selection module is further to identify the LOS component according to the identified frequency peak having a largest code phase error.

8. The receiver of claim 6, wherein, to identify the LOS component, the peak selection module is further to identify the LOS component according to whether a largest code phase error of the respective code phase errors corresponds to a first identified peak of the identified frequency peaks.

9. The receiver of claim 6, wherein, to identify the LOS component, the peak selection module is further to identify the LOS component according to a comparison between a largest code phase error of the respective code phase errors and a first code phase error corresponding to a first identified peak of the identified frequency peaks.

10. The receiver of claim 1, wherein the plurality of correlators are further to selectively adjust a Doppler measurement using the generated carrier frequency error.

11. A method of operating receiver, the method comprising:
   receiving, at a plurality of correlators, a satellite signal having a line of sight (LOS) component and a multipath (MP) component;
   generating correlator results corresponding to the received satellite signal;
   identifying frequency peaks in the received satellite signal based on the correlator results;
   identifying the LOS component of the received satellite signal based on the identified frequency peaks;
   at least one of (i) generating a code phase error corresponding to the identified LOS component and generating a carrier frequency error corresponding to the identified LOS component; and
   generating the correlator results based on at least one of the code phase error and the carrier frequency error.

12. The method of claim 11, further comprising (i) generating FFT results based on the correlator results, wherein the FFT results include a frequency spectrum of the correlator results.

13. The method of claim 12, wherein the FFT results include M×N FFT results, wherein M is a number of the plurality of correlators, and wherein N is a number of points of FFT processing performed.

14. The method of claim 12, wherein identifying the frequency peaks includes (i) identifying a first peak in the frequency spectrum, (ii) comparing the first peak to background noise, and (iii) selectively identifying the first peak as a frequency peak based on the comparison.

15. The method of claim 14, wherein identifying the frequency peaks includes (i) identifying a next peak in the frequency spectrum, (ii) comparing the next peak to background noise and the first peak, and (iii) selectively identifying the next peak as a frequency peak based on the comparison.

16. The method of claim 11, wherein identifying the LOS component includes (i) receiving respective code phase errors associated with the identified frequency peaks and (ii) identifying the LOS component based on the respective code phase errors.

17. The method of claim 16, wherein identifying the LOS component includes identifying the LOS component according to the identified frequency peak having a largest code phase error.

18. The method of claim 16, wherein identifying the LOS component includes identifying the LOS component according to whether a largest code phase error of the respective code phase errors corresponds to a first identified peak of the identified frequency peaks.

19. The method of claim 16, wherein identifying the LOS component includes identifying the LOS component according to a comparison between a largest code phase error of the respective code phase errors and a first code phase error corresponding to a first identified peak of the identified frequency peaks.

20. The method of claim 11, further comprising selectively adjusting a Doppler measurement using the generated carrier frequency error.

* * * * *